United States Patent Office 3,003,537
Patented Oct. 10, 1961

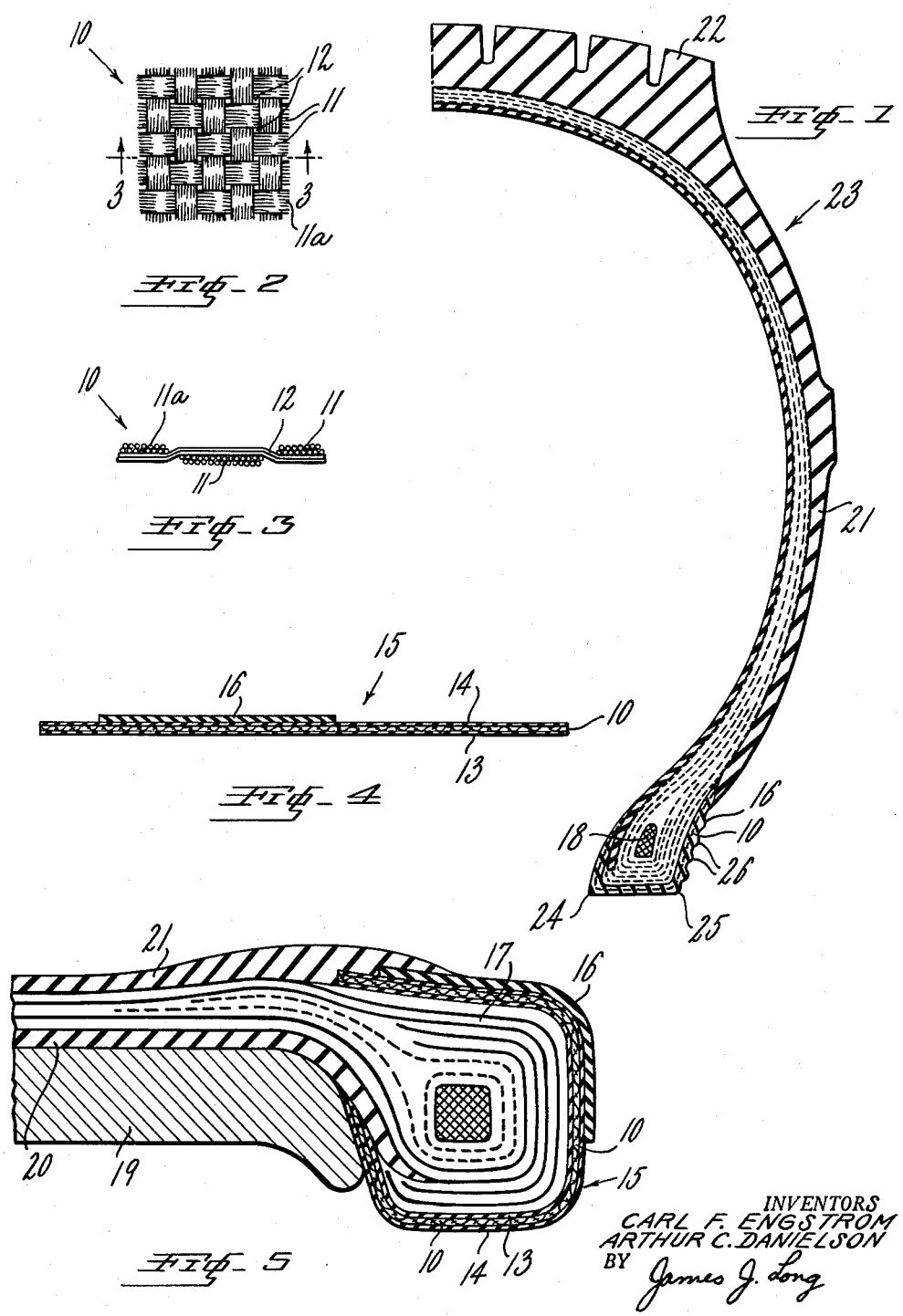

3,003,537
PNEUMATIC TIRE AND METHOD OF
MAKING SAME
Carl F. Engstrom, Detroit, and Arthur C. Danielson, Royal Oak, Mich., assignors to United States Rubber Company, New York, N.Y., a corporation of New Jersey
Filed Sept. 15, 1955, Ser. No. 534,497
6 Claims. (Cl. 152—362)

This invention relates to pneumatic tires, and more particularly it relates to a pneumatic tire of the tubeless type embodying an improved toe strip or chafer strip construction, as well as to a method of making such tire.

In the manufacture of tubeless tires it has proven to be an unusually difficult problem to construct the surface areas of the bead portion of the tire in such manner that these areas are formed in the proper shape and are capable of performing the desired functions effectively. The exterior bead surfaces of the tire, where the tire is in contact with the wheel rim, must be protected from abrasion or other damage and must provide a good air seal in order that air cannot escape between the tire and the wheel rim. The problem is complicated by the fact that entrance of air into the fabric reinforcing plies constituting the carcass of the tire must be prevented, otherwise such air will accumulate within the carcass plies and lead inevitably to delamination and air pockets known as blisters or blows, with consequent early failure of the tire.

It is therefore required that there be an impervious covering layer of rubber stock of substantial thickness over the bead surfaces of the tire. Previously known methods of applying such a covering layer or toe strip to the bead areas of the tire have not been entirely satisfactory, and it has been desired to improve upon the conventional practices. In particular, the usual toe strip or chafer strip made of rubberized ordinary woven fabric has had certain disadvantages, including an undesirable tendency to "wicking" of air along the twisted yarns of such fabric, that is, air entering into the fabric through any exposed portions thereof would travel along the twisted yarns within the plane of the fabric and eventually find its way either outside the tire, with consequent loss of internal pressure, or into the interior of the carcass body, with consequent delamination. On the other hand, if such conventional woven fabric were omitted from the toe strip or chafer stock, the bead surfaces would not be properly formed nor covered adequately with rubber stock, because of undue flow of the stock (in the absence of the restraining influence of the fabric) during molding of the tire.

The present invention is based on the discovery that if the toe strip is constructed in a manner to be described using the unique kind of fabric described in U.S. Patent 2,619,705, issued to Boutwell H. Foster on December 2, 1952, the aforementioned disadvantages are overcome. The disclosure of the said patent is hereby incorporated in the present disclosure by reference as descriptive of fabric suitable for the present purposes. Briefly, the fabric is an extremely lightweight, highly tear-resistant woven fabric, comprised of loosely woven untwisted singles yarns of continuous multifilaments that are free to shift relatively to each other in the yarn. The yarns are thus free to flatten out in the woven fabric like minute ribbons disposed in close parallel relation to each other, to form an unusually smooth faced fabric having interstices where the yarns cross each other. The fabric may be characterized as a well-covered loosely woven material in which the parallle yarns do not abut firmly one against the other. By "well covered" it is meant that there are not large voids or spaces between adjacent yarns.

In accordance with the invention, the above-described special fabric woven of untwisted, flattened, multi-filament yarns is impregnated with a rubber latex "solution" and dried to deposit a definite quantity of solid material within the multi-filament yarns. As a further aid to the latex impregnation, the fabric while passing through the latex dip is maintained under the least tension possible. The thus-solutioned or treated fabric is then coated on each surface with a continuous, impervious layer of vulcanizable solid rubber stock, called a "skim-coating," with the aid of a calender. This laminate of a central latex-solutioned, untwisted, woven, flat, multi-filament yarn and outer layers of rubber stock is applied as a chafer or toe strip to the raw tubeless tire assembly, conveniently while the tire is still in band form on the tire building drum, and the whole assembly is then vulcanized in the desired shape in the usual tire mold. It is surprisingly found that the described fabric of untwisted yarns, processed as indicated, is not only highly effective in maintaining the rubber stock in the chafer strip in its proper functional position, but it is also unexpectedly found that such a construction is not prone to wicking of air through the chafer strip.

Further advantages and objects of this method and construction will be made manifest in the following more detailed exposition of the invention, which is intended to be read with reference to the accompanying drawing, wherein:

FIG. 1 is a transverse sectional view of a tubeless type of pneumatic tire embodying the toe strip of the invention;

FIG. 2 is a face view on an enlarged scale of a piece of fabric made of untwisted, woven, flat, multi-filament yarns, as employed in preparing the toe strip;

FIG. 3 is a sectional view of the fabric on a still larger scale taken along line 3—3 of FIG. 2;

FIG. 4 is a sectional view of a toe strip embodying such fabric covered with vulcanizable rubber stock; and FIG. 5 is a fragmentary largely schematic sectional view showing how the toe strip is assembled with other portions of the raw tire on a tire building drum.

Referring to the drawing, the special woven fabric 10 of essentially untwisted, flattened, multi-filament yarns 11, is suitably comprised of rayon, preferably of the type known, as high tenacity rayon, and is formed of ribbon-like yarns each made up of a number of continuous synthetic filaments which have no or very little twist in the yarns, so that they will flatten out like minute ribbons in the fabric. Each yarn is composed of a plurality of filaments 11a. The yarns may, for example, be 600 denier yarns having negligible twist (e.g., approximately two turns per inch) as distinguished from the definitely high twist of conventional rayon yarns. The negligible twist in the yarn is merely the "producer's twist" of one or two turns per inch, used to keep the filaments of the yarn together. This fabric may suitably have, for example, 27 ends per inch in both the warp and weft. It is therefore essentially a square woven fabric, having substantially the same strength in each direction. The fabric is passed through a "solution" comprised of rubber latex, which contains the various supplemental compounding ingredients common in tire fabric solutioning practice, including such adhesion-promoting materials as resorcinol resin. For purposes of the invention the rubber and other solids deposited within the multi-filament yarns of the special fabric should be sufficient to substantially fill the available space within the yarns. In practice this is accomplished by depositing in the fabric at least about 8% and preferably at least about 9% or more of solids (on the weight of the fabric). This is preferably accomplished by utilizing a latex solution having a solids concentration of at least about 6% or more, and preferably at least about 7% or more. Preferably the fabric is passed through such a solution two times to insure complete saturation. The fabric is thereafter dried, suitably with the aid of moderate heat, which also serves to cure or set the rubber solids and any resin contained therein. It is observed that the wetted fabric does not shrink until it starts to dry, because of its essentially untwisted nature. When dried, the thus-impregnated fabric still has definite interstices or openings 12 between they arns, although all voids within the individual multi-filament yarns themselves are substantially filled with the latex solids.

The solutioned fabric is then skim-coated on each side on a rubber calender with impervious layers 13, 14 of solid vulcanizable rubber stock. The opposite skim-coatings 13, 14 on each side of the fabric "strike through" the spaces 12 between the yarns under the influence of the pressure and elevated temperature existing on the calender with the result that the opposite layers of rubber stick to each other and firmly embed the woven fabric therebetween. The skim coated fabric is bias-cut into the form of an elongated toe strip 15 in such manner that the fabric yarns extend at an angle of say 45° to the length of the strip. There is then typically positioned on one surface of the toe strip a longitudinally extending somewhat thicker 16 of vulcanizable rubber stock, termed, a "corrugation strip." The corrugation strip is suitably spaced slightly from one edge of the toe strip and it is of sufficient width to extend approximately to the heel of the bead in the finished tire. The toe strip assembly is then applied to the raw tire assembly as illustrated in FIG. 5, comprised of a multi-ply rubberized fabric carcass 17, in which the ends of the plies are wrapped around the usual inextensible wire bead assemblies 18 while supported on the usual collapsible tire building drum 19. The inner edge of the toe strip may overlap the air-impervious liner 20 of the carcass assembly as shown in FIG. 5 if such liner has already been applied to the band ply of the carcass, or, if the liner has not yet been inserted at this stage, the liner may overlap the inner edge of the toe strip when the liner is subsequently inserted after removal of the raw tire from the building drum. A vulcanized rubber sidewall stock 21 is applied over the outside of the carcass in such manner that its lower edge overlaps the upper edge of the corrugation strip 16. It will be understood that the usual tread portion 22 is also assembled with the other components in the conventional manner.

After removal from the tire building drum and shaping and curing in a mold in the usual manner, the finished tire 23 has the appearance shown in FIG. 1. The rubberized toe strip constitutes an air-impervious continuous covering for the bead area of the tire extending from the line on the interior of the tire and across the toe 24 and heel 25 of the bead, and up under the corrugation strip 16, which has had a plurality of circumferential sealing ribs 26, intended to engage the inner surface of the wheel flange, impressed on it during the molding.

The untwisted multi-filament yarn fabric 10 within the toe strip serves in a highly effective manner to maintain the toe strip rubber stock firmly in its proper functional place during the molding, in spite of the substantial displacing forces exerted on the assembly while the rubber is soft and plastic under the influence of the elevated temperature existing during the cure. Furthermore, in the event that any small portions of the fabric should become exposed, or should any small voids exist in the rubber covering of the toe strip fabric, the tire constructed in the manner described will still retain air because there is no tendency for wicking of air through the toe strip fabric. This is in direct contrast to the usual fabrics woven of twisted yarns, which are subject to wicking so that once air has access to the fabric it travels along the fabric and either finds its way into the interior body of the carcass or to the outside atmosphere, with highly detrimental results in either case.

The unique characteristic of the present untwisted woven yarns, whereby the fabric in the assembly is substantially incapable of wicking air, is demonstrable by actual measurement. Thus, in one such test, a length of the toe strip of the invention was vulcanized axially into a solid rubber disk in such manner that the ends of the strip stuck out of opposite faces of the disk. The rubber skim coating was then scraped away at each side of the toe strip where it emerged from the faces of the rubber disk to expose the fabric. This disk was then clamped firmly over an open end of a cylindrical air chamber into which a definite air pressure was introduced. Any wicking of air through the toe strip fabric would have resulted in loss of air from the chamber, but this did not occur with the present fabric, solutioned as recommended. This indicates that the fabric is not susceptible to wicking of air when so treated. In contrast, conventional rayon, cotton and nylon fabric made of the usual twisted yarns invariably wicked intolerable quantities of air, even after treatment with the latex solution. Even cementing the fabric before and after the latex dipping would not stop wicking of air in such fabrics made of twisted yarns. Likewise, multiple dipping in thermo-setting resins was of no avail to stop wicking. In view of this, the unexpectedness of the present discovery that wicking can be forestalled by employing the untwisted woven fabric will be appreciated.

In another interesting experiment, rayon fabric woven of twisted yarns was treated with the latex solution, and frozen before drying. The freezing caused the latex to coagulate in place within the fabric. The fabric was then dried, and it was observed that such fabric was considerably less susceptible to wicking. The significance of this experiment is believed to be that the wicking tendency of ordinary fabric woven from twisted yarns seems to be attributable to migration of the latex in the fabric during drying. When the latex was coagulated by freezing before drying, such migration could of course not occur, and wicking was reduced. Apparently this undesirable migration of the latex does not take place as readily or to as great an extent in the present fabric made of untwisted yarns, with the result that wicking is overcome.

Having thus described our invention, what we claim and desire to protect by Letters Patent is:

1. A pneumatic tire comprising an outer rubber tread and sidewall portions, an underlying carcass of rubberized fabric plies, the terminal ends of said plies being wrapped around inextensible bead members, and a toe strip overlying the outer surfaces of the bead areas, said toe strip being comprised of a loosely woven rubber-impregnated fabric of untwisted, flattened yarns, each of said yarns being made of a plurality of continuous filaments.

2. A pneumatic tire comprising an outer rubber tread and sidewall portions, an underlying carcass of rubberized fabric plies, the terminal ends of the said carcass plies being wrapped around inextensible bead members, an air-impervious liner secured to the interior surface of the carcass, and a toe strip overlying the outer surfaces of the bead areas, said toe strip being comprised of a loosely woven fabric of untwisted, flattened yarns, each of said yarns being made up of a plurality of continuous filaments, each of said filaments being completely surrounded by latex, said toe strip fabric being coated on each side with rubber stock.

3. In a pneumatic tire, the improvement comprising a toe strip made of a woven fabric of untwisted, flattened, multi-filament yarns impregnated with a latex solution so as to substantially fill all the available space within said yarns, said fabric being skim coated on each side with rubber stock.

4. A tubeless tire comprising a rubberized fabric carcass containing inextensible bead members in its terminal ends, a rubber tread and sidewall portions overlying the exterior surface of said carcass, said sidewall portions terminating on the exterior surface of the carcass near the bead areas, an air-impervious liner on the interior surface of the carcass terminating on said surface near the bead areas, toe strips extending over the bead areas from the terminations of the liner to the terminations of the sidewalls, said toe strips being comprised of a fabric which is woven of untwisted warp and weft singles yarns formed of continuous filaments that flatten out in the fabric so that each yarn has a width that is several times its thickness, said yarns being interwoven in spaced parallel relation to form a smooth face fabric having interstices through said fabric adjacent where said yarns cross, all of the available space within said yarns being substantially filled with latex, said fabric being skim-coated on each side with rubber stock which strikes through said interstices to embed said fabric firmly within said rubber stock.

5. In a tubeless pneumatic tire the method of forming a toe strip encompassing the bead area comprising, impregnating with a latex solution a loosely woven fabric of untwisted, flattened, multi-filament yarns, said yarns being interwoven in spaced parallel relation to form interstices through said fabric adjacent where said yarns cross, thereafter skim-coating the impregnated fabric with rubber stock on each side to cause said rubber stock to strike-through said interstices, cutting said fabric so as to form an elongated strip and applying said elongated strip to said tire so as to encompass the bead area thereof, whereby said tire and toe strip may be vulcanized in a tire mold.

6. A tubeless tire comprising a rubberized fabric carcass containing inextensible bead members in its terminal ends, a rubber tread and sidewall portions overlying the exterior surface of said carcass, said sidewall portions terminating on the exterior surface of the carcass near the bead areas, an air-imprevious liner on the interior surface of said carcass terminating on said surface near said bead areas, and toe strips extending over said bead areas from the terminations of said liner to the terminations of said sidewalls, said toe strips being comprised of a fabric woven of untwisted warp and weft singles yarns, said yarns being of approximately 600 denier and being composed of a plurality of high tenacity continuous rayon filaments having negligible twist so that each of said yarns flattens out in the fabric, each yarn having a width that is several times its thickness, said yarns being interwoven in spaced parallel relation to form a smooth face fabric having interstices through said fabric adjacent where said yarns cross, all of the available space within said yarns being substantially filled with latex, said fabric being skim-coated on each side with rubber stock which strikes through said interstices to embed said fabric firmly within said rubber stock.

References Cited in the file of this patent

UNITED STATES PATENTS

| | | |
|---|---|---|
| 2,587,470 | Herzegh | Feb. 26, 1952 |
| 2,592,844 | Antonson | Apr. 15, 1952 |
| 2,601,394 | Hansen | June 24, 1952 |
| 2,619,705 | Foster | Dec. 2, 1952 |
| 2,698,042 | Perkins | Dec. 28, 1954 |
| 2,739,918 | Illingworth | Mar. 27, 1956 |
| 2,902,073 | Lessig | Sept. 1, 1959 |

FOREIGN PATENTS

| | | |
|---|---|---|
| 1,084,382 | France | July 7, 1954 |